United States Patent
Makke et al.

(10) Patent No.: US 10,311,656 B2
(45) Date of Patent: Jun. 4, 2019

(54) VEHICLE PROCESSOR AND METHOD FOR TRACKING AND REPORTING VEHICLE USE AND ASSOCIATED FUEL COST

(71) Applicant: Ford Global Technologies, LLC, Dearborn, MI (US)

(72) Inventors: Omar Makke, Lyon Township, MI (US); Haysam M. Kadry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 14/881,875

(22) Filed: Oct. 13, 2015

(65) Prior Publication Data

US 2017/0103589 A1 Apr. 13, 2017

(51) Int. Cl.
| | |
|---|---|
| G01C 21/36 | (2006.01) |
| G06F 17/30 | (2006.01) |
| G07C 5/06 | (2006.01) |
| G06F 16/29 | (2019.01) |
| B60K 35/00 | (2006.01) |
| G06Q 10/02 | (2012.01) |

(Continued)

(52) U.S. Cl.
CPC .............. G07C 5/06 (2013.01); B60K 35/00 (2013.01); G06F 16/29 (2019.01); G06Q 10/025 (2013.01); G06Q 50/06 (2013.01); G07C 5/008 (2013.01); G07C 5/08 (2013.01); G07C 5/0825 (2013.01); B60K 2350/1076 (2013.01)

(58) Field of Classification Search
CPC .. G06N 99/005; G01C 21/36; G01C 21/3469; G06Q 10/025; G06F 16/29; B60K 2350/1076; B60K 2350/1092

USPC ................ 701/123, 532, 424–425; 430/438; 702/122; 706/45, 47–48

See application file for complete search history.

(56) References Cited

U.S. PATENT DOCUMENTS

| | | | |
|---|---|---|---|
| 5,893,893 A | 4/1999 | Holt et al. | |
| 6,064,929 A * | 5/2000 | Migues | G06Q 10/047 701/1 |

(Continued)

OTHER PUBLICATIONS

Designing Human Machine Interface for Vehicle's EFI Engine Using Siemen's PLC and SCADA System; Umair Younas; Sajjad Durrani; Yasir Mehmood; 2015 13th International Conference on Frontiers of Information Technology (FIT); Year: 2015 pp. 205-210, DOI: 10.1109/FIT.2015.44.*

(Continued)

Primary Examiner — Cuong H Nguyen
(74) Attorney, Agent, or Firm — Frank Lollo; Brooks Kushman P.C.

(57) ABSTRACT

A vehicle computing system includes a vehicle human-machine interface (HMI) and a vehicle processor coupled to the HMI and programmed to store trip information for multiple trips including consumed fuel cost for vehicle operation in response to a trip purpose input from the HMI. The trip purpose may be a business or personal purpose, for example. A fuel queuing model based on at least two fuel prices and corresponding fuel quantities may be used to determine the consumed fuel cost associated with fuel consumed from the vehicle fuel tank. Trip information, such as date, distance traveled, origin, destination, and consumed fuel cost may be output to a display, a wirelessly connected smartphone, and/or a remote server in response to a request from the HMI.

20 Claims, 4 Drawing Sheets

(51) Int. Cl.
*G06Q 50/06* (2012.01)
*G07C 5/00* (2006.01)
*G07C 5/08* (2006.01)

(56) References Cited

U.S. PATENT DOCUMENTS

| | | | |
|---|---|---|---|
| 6,856,933 B1 | 2/2005 | Callaghan | |
| 7,599,770 B2 | 10/2009 | Hardy | |
| 8,694,328 B1* | 4/2014 | Gormley | G06Q 30/0621 |
| | | | 705/1.1 |
| 9,151,631 B2* | 10/2015 | Lee | G01C 21/3469 |
| 9,734,528 B2* | 8/2017 | Gormley | G06Q 30/0621 |
| 9,747,626 B2* | 8/2017 | Gormley | G06Q 30/0621 |
| 2009/0109022 A1 | 4/2009 | Gangopadhyay et al. | |
| 2009/0172035 A1* | 7/2009 | Lessing | G06F 16/284 |
| 2010/0256903 A1* | 10/2010 | Johnson | G01C 21/32 |
| | | | 701/533 |
| 2010/0332113 A1* | 12/2010 | Tengler | G01C 21/3469 |
| | | | 701/123 |
| 2011/0112717 A1 | 5/2011 | Resner | |
| 2011/0137489 A1* | 6/2011 | Gilleland | B60R 25/24 |
| | | | 701/2 |
| 2012/0278266 A1* | 11/2012 | Naslund | G06N 99/005 |
| | | | 706/45 |
| 2013/0159155 A1 | 6/2013 | Kim et al. | |
| 2013/0162451 A2* | 6/2013 | Pikolon | B60K 15/00 |
| | | | 341/22 |
| 2013/0275013 A1 | 10/2013 | Kote et al. | |
| 2014/0100767 A1 | 4/2014 | Milkovic et al. | |
| 2014/0277835 A1* | 9/2014 | Filev | G01C 21/3469 |
| | | | 701/2 |
| 2015/0106001 A1* | 4/2015 | Lee | G01C 21/3469 |
| | | | 701/123 |
| 2015/0239454 A1* | 8/2015 | Sujan | F02D 41/1401 |
| | | | 701/54 |

OTHER PUBLICATIONS

Autonomous vehicle using GPS and magnetometer with HMI on LabVIEW; M. Bilal Shahid; M. Umer Shahzad; Syed M. Rameez Bukhari; M. Abbas Abasi; 2016 Asia-Pacific Conference on Intelligent Robot Systems (ACIRS) Year: 2016; pp. 163-167, DOI: 10.1109/ACIRS.2016.7556206.*

A PHEV Power Management Cyber-Physical System for On-Road Applications; Bingnan Jiang; Yunsi Fei; IEEE Transactions on Vehicular Technology; Year: 2016, vol. PP Issue: 99; pp. 1-1, DOI: 10.1109/TVT.2016.2642836.*

Reuse historic costs in dynamic programming to reduce computational complexity in the context; Tianyi Guan; Christian W. Frey 2015 IEEE International Conference on Vehicular Electronics and Safety (ICVES); pp. 256-263. (Year: 2015).*

Analyzing automobile Performance by Powertrain Simulation and Fuzzy Control; Lingyun Jiang ; Xilu Wang; 2010 International Conference on Electrical and Control Engineering; pp. 2667-2670. (Year: 2010).*

Social cost comparison among fuel cell vehicle alternatives; J.F. Contadini; Collection of Technical Papers. 35th Intersociety Energy Conversion Engineering Conference and Exhibit (IECEC) (Cat. No. 00CH37022); vol. 2; pp. 1341-1351. (Year: 2000).*

Unified predictive fuel efficiency optimization using traffic light sequence information; Tianyi Guan ; Christian Walter Frey; 2016 IEEE Intelligent Vehicles Symposium (IV); pp. 1103-1108. (Year: 2016).*

Great Britain Search Report for Great Britain Application No. 1617249.6 dated Apr. 28, 2017.

* cited by examiner

| DATE | COORDINATE | FROM | TO | MILES | COST | | | |
|---|---|---|---|---|---|---|---|---|
| 2/15/2015 | (80.113, 81.113) | 1234 Address | 2345 Address | 518 | $80 | | | |
| ... | | | | | | | | |
| TOTAL BUSINESS USAGE COST IN 2015: | | | | | | | | |
| $5,530 | | | | | | | | |

FIG. 4

VEHICLE PROCESSOR AND METHOD FOR TRACKING AND REPORTING VEHICLE USE AND ASSOCIATED FUEL COST

TECHNICAL FIELD

Aspects of the disclosure relate to a vehicle telematics system having a processor for tracking and reporting mileage, costs, or other parameters related to vehicle use and associated purposes.

BACKGROUND

Vehicles may be used in a variety of applications related to personal use as well as in the operation of a business. Employers and/or government regulatory and taxing authorities may require records of vehicle use and associated expenses. Accurate contemporaneous recordkeeping of costs associated with vehicle operation and maintenance, such as fuel, electricity (for electric or plug-in hybrid vehicles), maintenance, repairs, and the like may better enable both businesses and individuals to manage vehicle-related expenses for subsequent reporting and analysis. However, detailed logs of expenses and uses may be inconvenient and require considerable time for contemporaneous recording. Records created some time after completion of trips may not be as accurate and may not meet certain government or regulatory agency guidelines or requirements.

SUMMARY

In various embodiments, a method or system for a vehicle computing system to track and report expenses associated with a particular trip purpose includes a vehicle human-machine interface (HMI), and a vehicle processor coupled to the HMI, programmed to store, in persistent memory, trip information for multiple trips including fuel cost for operation in response to a trip purpose input from the HMI using a fuel queuing model based on at least two fuel prices and corresponding fuel quantities. The trip information including the fuel cost is output in response to a request from the HMI. The system may include a wireless transceiver in communication with the vehicle processor with the vehicle processor further programmed to obtain a fuel price from a remote database using the wireless transceiver in response to detecting vehicle fueling. The vehicle processor may be further programmed to communicate vehicle GPS coordinates using the wireless transceiver to obtain the fuel price based on a vehicle fueling location, and to determine a fuel quantity in response to detecting vehicle fueling. The fuel queuing model may be implemented using a first-in first-out (FIFO) model. The trip information including the fuel cost for multiple trips associated with a selected purpose may be output to the HMI, or using the wireless transceiver. In one embodiment, the vehicle processor is further programmed to output the trip information including the fuel cost for multiple trips to a mobile device and/or a remote server.

Embodiments may also include a method performed by a programmed vehicle computing system that includes storing a fuel cost and associated quantity for each vehicle fueling, storing trip information and an associated trip purpose including consumed fuel cost calculated using a fuel queuing model populated with the fuel costs and associated quantities that assigns consumed fuel to a purchased fuel batch, and outputting the trip information for all trips having a specified purpose in response to a user request. The trip information may be transmitted to a wirelessly coupled smartphone and may include a date, distance traveled, origin information, and destination information. The cost of fuel consumed during a trip may be calculated using a FIFO fuel queuing model. The method may also include automatically detecting the associated quantity of fuel for each vehicle fueling. In other embodiments, fuel cost may be determined based on a weighted average of the fuel price and quantity purchased. In some embodiments, the user may select the method used by the vehicle computing system to compute the fuel cost via the HMI. During vehicle operation, the HMI may display various trip parameters associated with the fuel cost, such as the current cost of fuel being used, the accumulated cost of a particular trip, and/or estimated fuel cost for the entire trip based on a destination entered into the HMI or vehicle navigation system, for example.

In addition, embodiments may include a computer program product embodied in non-transitory computer readable storage having instructions for programming a processor of a vehicle to communicate with a mobile device having a display, the computer program product may include instructions for communicating cost of consumed fuel associated with trips having a specified purpose to the mobile device, the cost calculated using a FIFO fuel model to determine price of the consumed fuel based on a plurality of previously purchased fuel quantities and associated prices. The instructions may also program the processor to detect a vehicle fueling event and automatically determine an associated fuel quantity. The instructions may also include instructions for obtaining a fuel price for the associated fuel quantity in response to detecting the vehicle fueling event.

Embodiments according to the present disclosure may provide one or more advantages. For example, automatic detection of fueling events and fuel price information provides more accurate and reliable record keeping for vehicle expenses than manual entry. Integrated tracking and reporting of fuel cost and associated trip purpose and trip information provides convenient access to information for reporting to employers or government agencies to more accurately track trips and expenses for a particular purpose, such as business-related or personal uses.

The above advantages and other advantages and features associated with various embodiments will be readily apparent to those of ordinary skill in the art from the following detailed description when taken in connection with the accompanying drawings.

DETAILED DESCRIPTION

As required, detailed embodiments are disclosed herein; however, it is to be understood that the disclosed embodiments are merely representative and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
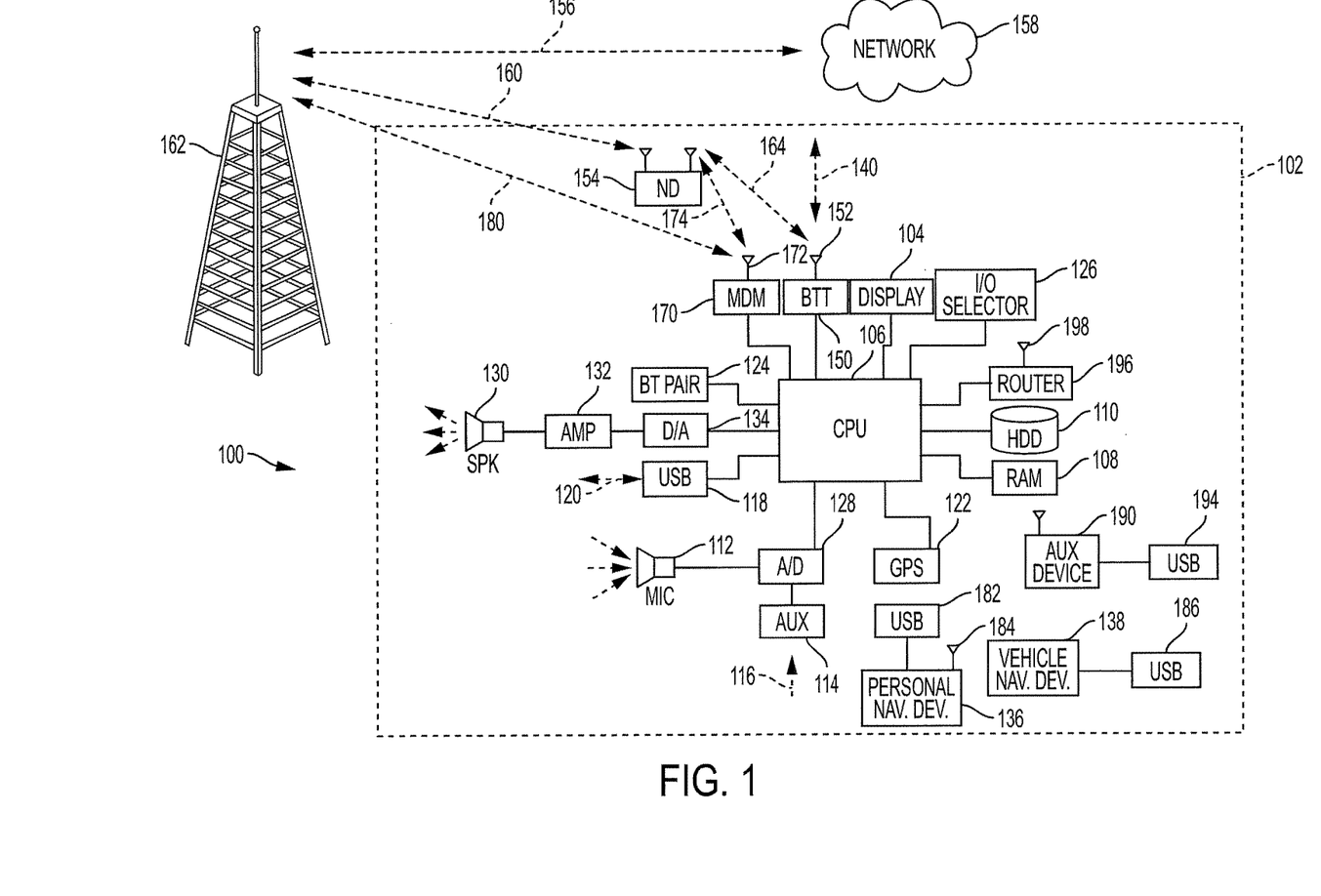
FIG. 1 is a block diagram illustrating a vehicle having integrated trip purpose and cost tracking and reporting according to one embodiment.

FIG. 1 illustrates an example block topology for a vehicle based computing system 100 (VCS) for a vehicle 102. An example of such a vehicle-based computing system 100 is the SYNC system manufactured by THE FORD MOTOR COMPANY. A vehicle enabled with a vehicle-based computing system may contain a visual front end interface 104 located in the vehicle. The user may be able to interact with interface 104, for example, using a touch sensitive screen. In another illustrative embodiment, the interaction occurs through button presses or spoken dialog processed by automatic speech recognition and speech synthesis systems.

In the illustrative embodiment shown in FIG. 1, a processor 106 controls at least some portion of the operation of the vehicle-based computing system. Provided within the vehicle, the processor allows onboard processing of commands and routines. Further, the processor is connected to various types of computer program products implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent (non-transitory) memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

The processor is also provided with a number of different inputs and outputs to facilitate user interaction with the processor and related devices. In this illustrative embodiment, a microphone 112, an auxiliary input 114 (for input 116), a USB interface 118 (for input/output 120), a GPS input 122, display screen 104, which may be a touchscreen display, and a BLUETOOTH pairing interface 124 are all provided. An input/output (I/O) selector 126 may be provided to facilitate user selection of a particular input/output for use. Input to both microphone 112 and auxiliary interface 114 may be converted from analog to digital signals by an associated A/D converter 128 before being communicated to the processor 106. Although not explicitly illustrated, vehicle components and auxiliary components in communication with the VCS may use a wired or wireless vehicle network (including, but not limited to, a CAN bus) to communicate signals representing data to and from the VCS (or components thereof).

System outputs may include, but are not limited to, a visual display 104 and speakers 130 or other stereo system output. Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 140 and 120.

In one illustrative embodiment, system 100 uses a BLUETOOTH transceiver 150 to wirelessly communicate 152 with a mobile or nomadic device 154 (e.g., cell phone, smart phone, PDA, or any other device having wireless remote network connectivity). Nomadic device 154 can then be used to communicate 156 with a network 158 outside vehicle 102 through, for example, communication 160 with a satellite or cellular tower 162. In some embodiments, cellular tower 162 or a similar tower or antenna may function as a WiFi access point.

Nomadic device 154 may also be paired to vehicle 102 and communicate via BLUETOOTH or similar technology as represented by signal 164. Pairing of nomadic device 154 and BLUETOOTH transceiver 150 may be initiated by an associated button or interface 124, or similar input. Accordingly, CPU 106 pairs an onboard BLUETOOTH transceiver 152 with a BLUETOOTH transceiver in nomadic device 154.

Data may be communicated between CPU 106 and network 158 utilizing, for example, a data-plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 102 through, for example, communication 160 with cellular tower 162. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include WiFi and have considerable cross-functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

In another embodiment, nomadic device 154 includes a modem for voice band or broadband data communication. In the data-over-voice embodiment, a technique known as frequency division multiplexing may be implemented allowing the owner of the nomadic device to talk over the device while data is being transferred. At other times, when the owner is not using the device, the data transfer can use the entire available bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. In another embodiment, nomadic device 154 is replaced with a cellular communication device (not shown) that is installed in vehicle 102. In other embodiments, nomadic device 154 may be implemented by a wireless local area network (LAN) device capable of communication over, for example (and without limitation), an 802.11g network (i.e., WiFi) or a WiMax network, for example.

In one embodiment, incoming data can be passed through nomadic device 154 through onboard BLUETOOTH transceiver 150 to processor 106. In the case of certain temporary data, for example, the data can be stored on HDD 110 or other storage media until such time as the data is no longer needed.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FireWire™ (Apple), i.LINK™ (Sony), and Lynx™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 1, processor 106 may communicate with various other types of auxiliary devices 190. These devices may be connected through a wireless connection/ antenna 192 and/or a wired connection 194. Auxiliary devices 190 may include, but are not limited to, personal media players, wireless health devices, portable computers, and the like. Processor 106 may also be connected to a vehicle based wireless router 196, using for example a WiFi (IEEE 803.11) transceiver 198. This could allow processor 106 to connect to remote networks in range of vehicle based wireless router 196.

In one embodiment, vehicle computing system 100 utilizes processor 106 and associated temporary and persistent memory RAM 108 and HDD 110, respectively to track and report expenses associated with a particular vehicle trip purpose. Display 104 may be used in combination with one or more inputs and outputs, such as microphone 112, speaker 130, and/or nomadic device 154 functioning as a vehicle human-machine interface (HMI). Vehicle processor 106 is coupled to the HMI and programmed to store, in persistent memory 110, trip information for multiple trips including fuel cost for operation in response to a trip purpose input from the HMI. Fuel cost is computed using a fuel queuing model based on at least two fuel prices and corresponding fuel quantities as illustrated and described in greater detail with reference to FIGS. 2-4. The trip information including the fuel cost is output in response to a request from the HMI. In one embodiment, trip information is output to display 104.

As previously described, system 100 may include a wireless transceiver, such as BLUETOOTH transceiver 152, modem 170, or router 196, for example, in communication with vehicle processor 106 with vehicle processor 106 further programmed to obtain a fuel price from a remote database that may be stored on network 158, for example, using the wireless transceiver in response to detecting vehicle fueling. Vehicle processor may be further programmed to communicate vehicle GPS coordinates from GPS module 122 using one or more wireless transceivers 152, 170, 196 to obtain the fuel price based on a vehicle fueling location, and to determine a fuel quantity in response to detecting vehicle fueling. As illustrated and described with reference to FIG. 2, the fuel queuing model may be implemented using a first-in first-out (FIFO) model. The trip information including the fuel cost for multiple trips associated with a selected purpose may be output to the HMI, or using the wireless transceiver. In one embodiment, vehicle processor 106 is further programmed to output the trip information including the fuel cost for multiple trips to a mobile device, such as nomadic device 154 and/or a remote server accessible via remote network 158.

Figure 2:
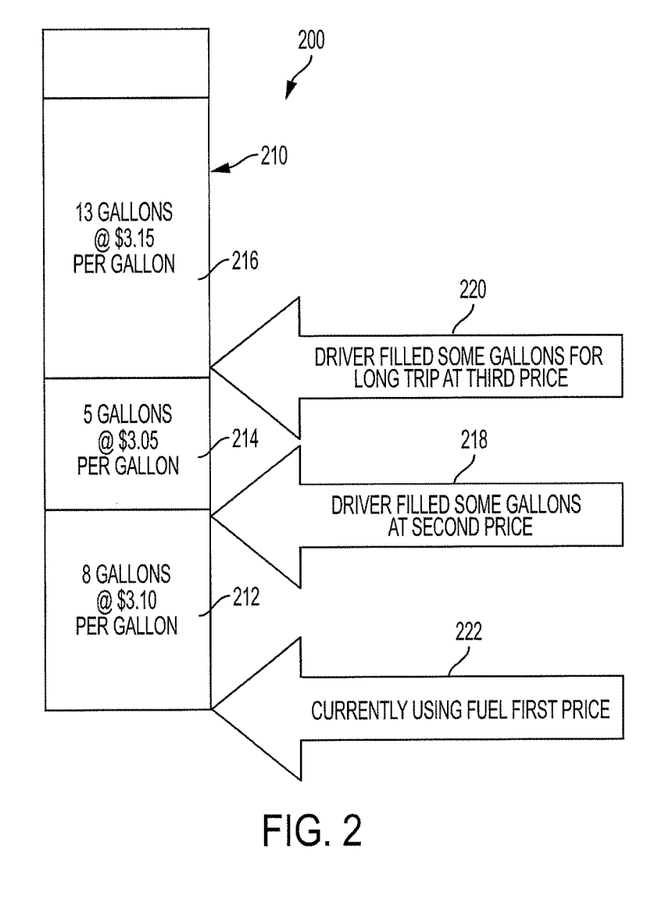
FIG. 2 is a graphical depiction of a fuel queuing model for use in determining consumed fuel cost associated with a trip purpose according to one embodiment.

FIG. 2 is a graphical depiction of a fuel queuing model for use in determining consumed fuel cost associated with a trip purpose according to one embodiment. A fuel queuing model 200 represents quantities of fuel and associated prices of fuel stored in a vehicle fuel tank. The fuel queuing model may be stored in non-volatile or persistent memory 110 (FIG. 1), for example, and represents one or more batches of fuel remaining in the vehicle fuel tank. In the representative embodiment illustrated in FIG. 2, a first quantity of fuel 212 is purchased at a first fuel price 222, a second quantity of fuel 214 is purchased at a second price 218, and a third quantity of fuel 216 is purchased at a third price 220. The fuel queuing model allocates fuel consumed during a particular trip based on a corresponding model rule or strategy. In one embodiment, a first-in, first-out (FIFO) strategy is used to determine fuel cost. For a FIFO strategy, a trip with a designated purpose for tracking that starts after purchasing fuel quantity 214 and/or fuel quantity 216 would assume that the first fuel quantity 212 is used first and calculate the cost of consumed fuel based on the first price 222. If the entire first quantity 212 is used during the trip, the FIFO strategy assumes that the second fuel quantity 214 (or portion thereof) is used next and would calculate the cost of the consumed fuel based on the second price 218. The third fuel quantity 216 is assumed or assigned to be used last with the third price 220 used to calculate the cost for any of that fuel consumed during the trip.

Of course, other queuing rules or strategies may be used to allocate a fuel cost to a consumed quantity, such as a last-in, first-out (LIFO) strategy, for example. In one embodiment, fuel cost may be determined based on a weighted average of the fuel price and quantity purchased. In the example of FIG. 2, the weighted average fuel cost would be determined according to (8 gallons*$3.10+5 gallons*$3.05+13 gallons*$3.15)/(8 gallons+5 gallons+13 gallons)=$3.12/gallon. In some embodiments, the user may select the method used by the vehicle computing system to compute the fuel cost via the HMI using a corresponding menu or prompt. During vehicle operation, the HMI may display various trip parameters associated with the fuel cost, such as the current cost of fuel being used, the accumulated fuel cost of a particular trip, and/or estimated fuel cost for the entire trip based on a destination entered into the HMI or vehicle navigation system, for example. Operation of a representative embodiment using a fuel queuing model as represented in FIG. 2 to allocate and accumulate cost of fuel consumed during a designated trip is illustrated and described with reference to FIG. 3. Those of ordinary skill in the art will recognize that fuel quantities and costs may also generally represent any type of fuel or power source for the vehicle including, but not limited to, electricity cost for electrified vehicles, such as electric or hybrid vehicles.

Figure 3:
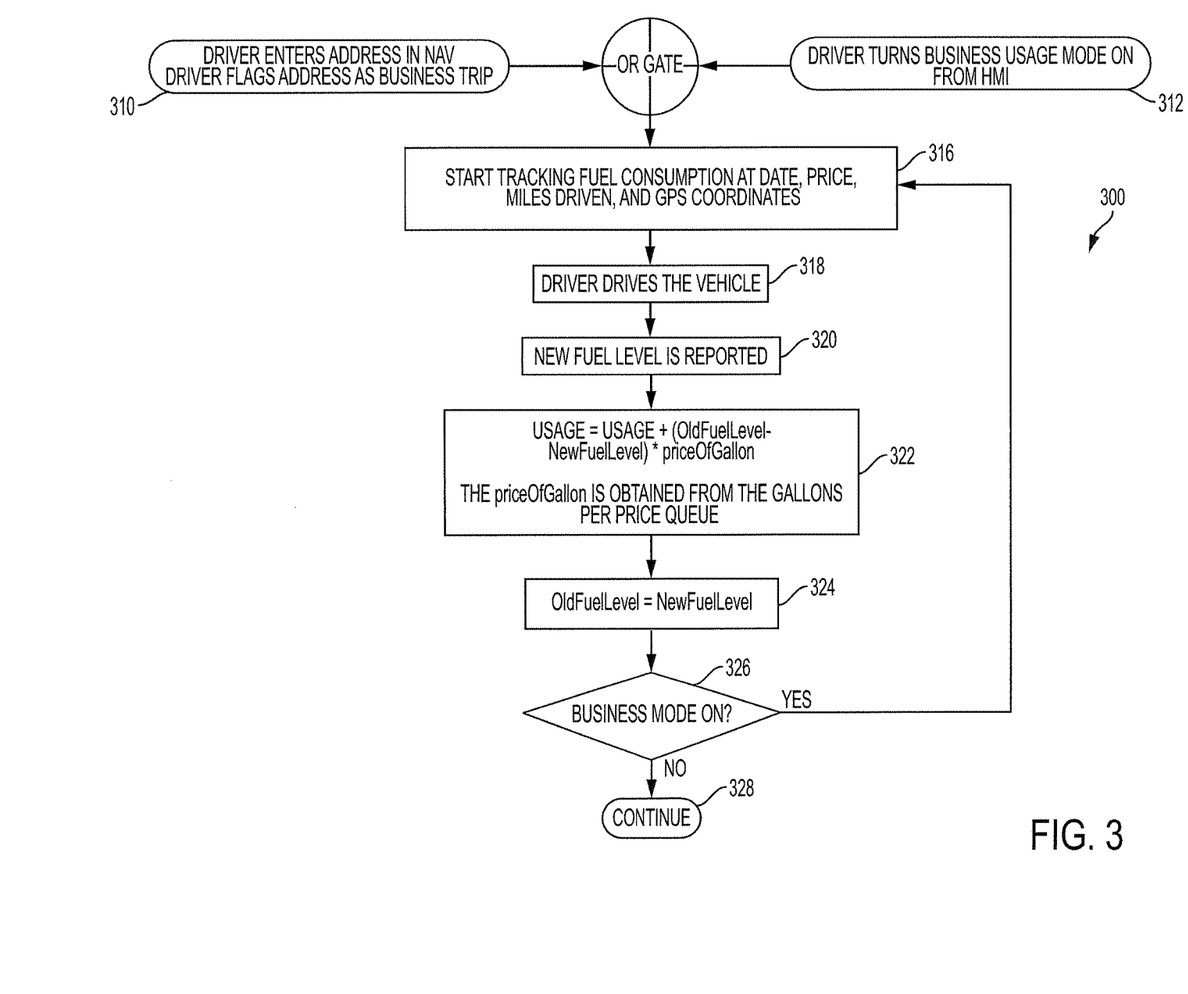
FIG. 3 is a flowchart illustrating operation of a system or method for tracking and reporting trip purpose and associated information including fuel cost according to one embodiment.

FIG. 3 is a flowchart illustrating operation of a system or method for tracking and reporting trip purpose and associated information including fuel cost according to one embodiment. The process 300 illustrated in the representative embodiment may be executed by a vehicle computing system 100 (FIG. 1) located in a vehicle 102 (FIG. 1). In some embodiments, processes may be executed by a computing system in communication with a vehicle computing system. Such a system may include, but is not limited to, a wireless device (e.g., and without limitation, a mobile phone or portable computer) or a remote computing system (e.g., and without limitation, a server or computer) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not send and receive information with itself. One of ordinary skill in the art will understand when it is inappropriate to apply a particular VACS to a given function or process or portion thereof. It is contemplated that at least the vehicle computing system 100 (FIG. 1) (VCS) located within the vehicle is capable of performing the illustrated functions or processes.

FIG. 3 is a flow chart illustrating an example method of the VCS 1 configuring the mobile device 53 to emulate the vehicle HMI display 4 according to an embodiment. The method 300 may be implemented using software code contained within the VCS 1, mobile device 53, and/or a combination thereof.

As generally understood by those of ordinary skill in the art, the method 300 may be implemented through a computer algorithm, machine executable code, or software instructions programmed into one or more suitable programmable logic devices associated with the vehicle, such as CPU 106, nomadic device 154, remote network 158, another controller in communication with the vehicle computing system, or a combination thereof. Although the various operations shown in the diagram 300 appear to occur in a chronological sequence, one or more of the operations or features may be performed in a different order, may be repeatedly performed, or may be performed concurrently or not at all.

Method or process 300 may begin with a user or vehicle operator entering a destination address into the vehicle navigation system and designating a purpose for the trip as represented at 310. Depending on the particular application and implementation, one or more trip purposes may be available for selection and tracking. In the representative embodiment illustrated, the operator may designate the trip as a business trip using the vehicle HMI or a paired or connected mobile device, for example. Alternatively, the operator may designate a trip purpose without entering a particular destination as represented by block 312. The designated purpose may return to a default value on each key or ignition cycle in some embodiments. Various types of trip information may be stored along with a selected or designated purpose as represented at 316. Trip information may include starting and/or ending GPS coordinates or addresses, date, time, odometer mileage, fuel level, etc. The VCS may prompt the user via the HMI to enter various types of trip information, or may automatically enter the information based on information received from one or more sensors, controllers, or messages broadcast on the vehicle network, for example. In one embodiment, a vehicle fuel sensor may be used to determine and store fuel levels at the beginning and end of a trip, and at the beginning and end of each fueling event. For electrified vehicles, a battery electronic control module (BECM) may store a starting and/or ending state of charge. Various types of trip information may also be periodically calculated by the VCS, such as fuel cost or miles driven, for example.

After designating a trip purpose as represented at 310 or 312, the VCS begins tracking fuel consumption and various other trip information as represented at 316 as the operator drives the vehicle as represented at 318. A fueling event may be detected or reported as generally represented at 320. In some embodiments, the VCS automatically detects a fueling event and may automatically obtain a fuel price based on a wireless communication with the fueling station, or via a remote database of fuel prices based on the vehicle location as determined by GPS coordinates. In one embodiment, the fuel price is automatically obtained using dedicated short range communications (DSRC) through vehicle to station infrastructure. Alternatively, the VCS may prompt the driver to enter a fuel price per gallon (or liter) or a total fuel cost, in which case the VCS may compute a price per quantity for subsequent use. The fuel price and/or quantity may also be obtained from a connected mobile device from an associated communication network or entered by a user and pushed to the VCS. The fuel quantity and price is stored in a fuel queuing model, such as the representative fuel queuing model illustrated and described in FIG. 2.

Fuel consumption and associated price may be periodically computed throughout the trip as generally indicated at 322. The fuel cost is retrieved for the corresponding fuel batch or quantity assigned or assumed for use based on the fuel queuing model as previously described. The fuel price for a particular fueling event or batch is then multiplied by the fuel consumed to determine the fuel cost. The particular fueling event or batch of fuel assigned for use is based on the type of fuel queuing model. For example, a vehicle that has fuel from three different fueling events obtained for three different prices in the fuel tank at the beginning of a trip as generally illustrated in FIG. 2, and using a FIFO costing strategy or fuel queuing model, that uses a total of ten gallons of fuel on a particular trip will determine the accumulated cost of fuel consumed during the trip based on the first price and first quantity (8 gallons in this example) added to the second price multiplied by the remaining fuel consumed (2 gallons in this example) from the second quantity of fuel, leaving 3 gallons purchased at the second fuel price for possible use during a subsequent trip. A LIFO queuing model would assign the most recently purchased fuel to be consumed first. In the current example, the most recent fuel purchase (as illustrated in FIG. 2) would be sufficient to calculate the consumed fuel cost using the fuel consumed (10 gallons) at the third fuel price ($3.15 per gallon), again leaving 3 gallons from the most recent fueling event for use during a subsequent trip.

The current fuel level is then set to the new fuel level as indicated at 324. The process repeats if the same trip purpose is indicated at 326 to periodically calculate the fuel cost. When the trip ends as determined by reaching the programmed destination, or by the operator confirming the trip ending, or changing the trip purpose to a new purpose at 326, the tracking process continues by storing the trip information for future reporting in response to user input by displaying the accumulated trip information for multiple trips having the same purpose on the HMI, or sending the accumulated trip information to a remote device, such as a smart phone, computer, or server as generally represented at 328.

Various tracking and reporting options may be selected or controlled via the HMI. For example, fuel pricing may be automatically obtained when available or manually entered, or may be entered by price per quantity, or total cost with the VCS calculating the quantity. Reporting options may include selection of an output device or remote network location for reporting, selection of a reporting period, reporting by trip purpose, total cost, destination, etc. In one embodiment, the operator has the ability to delete or remove particular trip entries, or to change the trip purpose in case the operator forgets to properly designate a trip. Other manual modification of trip data may be prohibited, or may be allowed only upon entering a security code or password, for example, to deter unauthorized modification of trip information.

Figure 4:
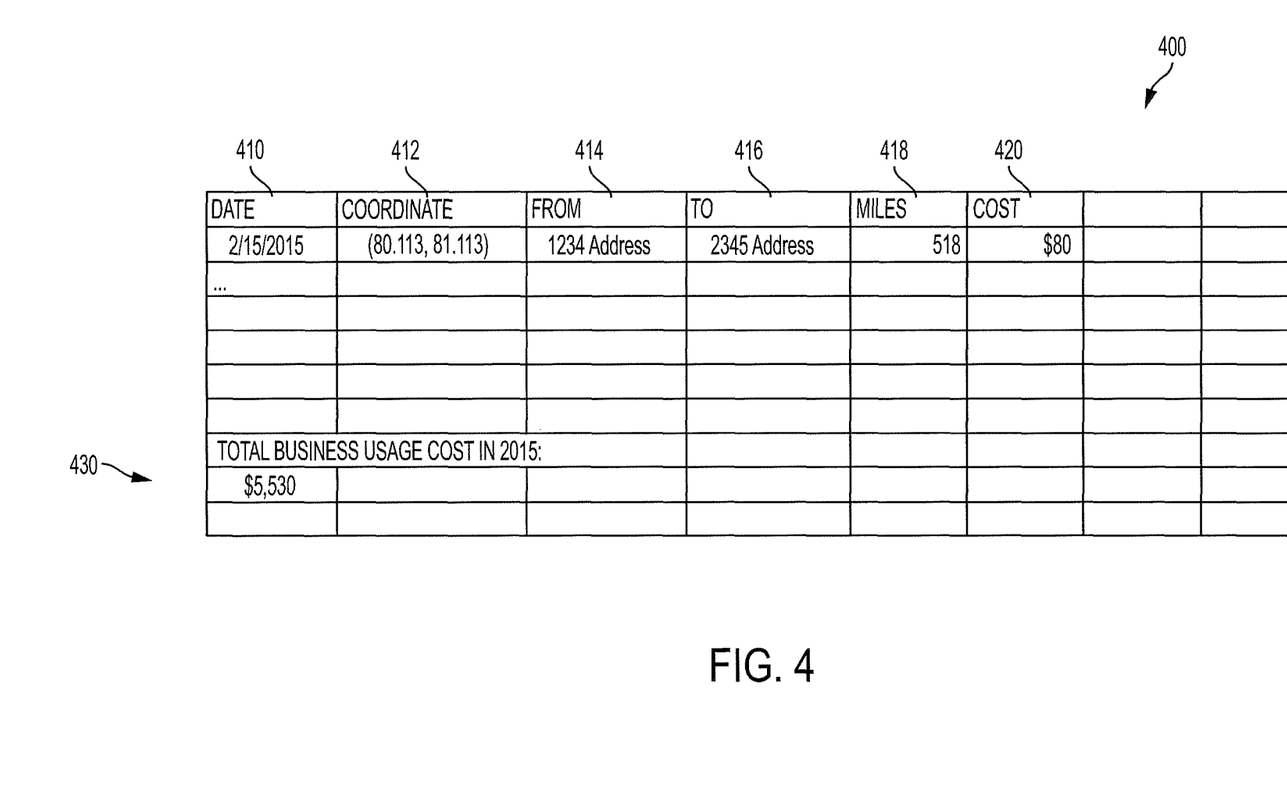
FIG. 4 illustrates a representative trip report output to a vehicle HMI or connected nomadic device in response to a user request according to an embodiment.

FIG. 4 illustrates a representative trip report output to a vehicle HMI or connected nomadic device in response to a user request according to an embodiment. In this example, trip information includes the date 410, GPS coordinates 412, starting location/address 414, ending location/address 416, miles driven 418, and fuel cost 420. The accumulated trip costs for a particular reporting period may also be provided as indicated at 430. Of course, the illustrated trip information and reporting format are only one non-limiting example of the type and presentation of information that may be provided by the VCS based on a fuel queueing model according to embodiments of the present disclosure.

As such, embodiments according to the present disclosure may provide one or more advantages such as automatic detection of fueling events and fuel price information for more accurate and reliable record keeping for vehicle expenses. In addition, integrated tracking and reporting of fuel cost based on a fuel queueing model and associated trip purpose and trip information provides convenient access to information for reporting to employers or government agencies to more accurately track trips and expenses for a particular purpose, such as business-related or personal uses.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A system comprising:
a vehicle HMI; and
a vehicle processor coupled to the HMI, programmed to:
store, in persistent memory, trip information for multiple trips including fuel cost for operation in response to a trip purpose input from the HMI using a fuel queueing model based on at least two fuel prices and corresponding fuel quantities, and
output the trip information including the fuel cost in response to a request from the HMI.

2. The system of claim 1 further comprising a wireless transceiver in communication with the vehicle processor, the vehicle processor further programmed to obtain a fuel price from a remote database using the wireless transceiver in response to detecting vehicle fueling.

3. The system of claim 2, the vehicle processor further programmed to communicate vehicle GPS coordinates using the wireless transceiver to obtain the fuel price based on a vehicle location during a detected vehicle fueling event.

4. The system of claim 2, the vehicle processor further programmed to determine a fuel quantity in response to detecting vehicle fueling.

5. The system of claim 1 wherein the fuel queueing model comprises a FIFO model.

6. The system of claim 1, the vehicle processor further programmed to output the trip information including the fuel cost for multiple trips to the HMI.

7. The system of claim 1 further comprising a wireless transceiver in communication with the vehicle processor, the vehicle processor further programmed to output the trip information including the fuel cost for multiple trips using the wireless transceiver.

8. The system of claim 7, the vehicle processor further programmed to output the trip information including the fuel cost for multiple trips to a mobile device.

9. The system of claim 7, the vehicle processor further programmed to output the trip information including the fuel cost for multiple trips to a remote server.

10. The system of claim 1, the vehicle processor further programmed to delete selected trip information including the fuel cost from persistent memory in response to input received from the HMI that modifies the trip purpose.

11. The system of claim 1, the vehicle processor further programmed to reset the trip purpose to a default value in response to a vehicle ignition cycle.

12. The system of claim 1, the vehicle processor further programmed to prompt for fuel price input via the HMI in response to detecting vehicle fueling.

13. A method performed by a programmed vehicle computing system, comprising:
storing a fuel cost and associated quantity for each vehicle fueling;
storing trip information and an associated trip purpose including consumed fuel cost calculated using a fuel queueing model populated with the fuel costs and associated quantities that assigns consumed fuel to a purchased fuel batch; and
outputting the trip information for all trips having a specified purpose in response to a user request.

14. The method of claim 13, the trip information including a date, distance traveled, origin information, and destination information.

15. The method of claim 13, the cost of fuel consumed during a trip being calculated using a FIFO fuel queueing model.

16. The method of claim 13 further comprising automatically detecting the associated quantity of fuel for each vehicle fueling.

17. The method of claim 13 wherein outputting the trip information comprises transmitting the trip information to a smartphone coupled wirelessly or through a wired connection.

18. A computer program product embodied in non-transitory computer readable storage having instructions for programming a processor of a vehicle to communicate with a mobile device having a display, comprising instructions for:
   communicating cost of consumed fuel associated with trips having a specified purpose to the mobile device, the cost calculated using a FIFO fuel model to determine price of the consumed fuel based on a plurality of previously purchased fuel quantities and associated prices.

19. The computer program product of claim 18 further comprising instructions for detecting a vehicle fueling event and automatically determining an associated fuel quantity.

20. The computer program product of claim 19 further comprising instructions for obtaining a fuel price for the associated fuel quantity in response to detecting the vehicle fueling event.

* * * * *